(12) United States Patent
Meixner et al.

(10) Patent No.: US 7,293,796 B2
(45) Date of Patent: Nov. 13, 2007

(54) GAS GENERATOR

(75) Inventors: Rudolf Meixner, Ampfing (DE);
Helmut Pritz, Ampfing (DE); Herbert Ragner, Furth (DE)

(73) Assignee: TRW Airbag Systems GmbH, Aschau (DE)

( * ) Notice: Subject to any disclaimer, the term of this patent is extended or adjusted under 35 U.S.C. 154(b) by 441 days.

(21) Appl. No.: 10/924,563

(22) Filed: Aug. 24, 2004

(65) Prior Publication Data

US 2005/0067822 A1    Mar. 31, 2005

(30) Foreign Application Priority Data

Sep. 3, 2003   (DE) .................... 203 13 664 U

(51) Int. Cl.
*B60R 21/26* (2006.01)

(52) U.S. Cl. ...................... 280/736; 102/531
(58) Field of Classification Search ................ 280/736, 280/741, 742; 102/531
See application file for complete search history.

(56) References Cited

U.S. PATENT DOCUMENTS

| | | | |
|---|---|---|---|
| 5,762,368 A * | 6/1998 | Faigle et al. ................. | 280/737 |
| 5,970,880 A * | 10/1999 | Perotto ......................... | 102/531 |
| 6,196,583 B1 * | 3/2001 | Ruckdeschel et al. ...... | 280/736 |
| 6,237,498 B1 * | 5/2001 | Winterhalder et al. ...... | 102/530 |
| 6,314,888 B1 | 11/2001 | Muller et al. | |
| 6,474,685 B1 | 11/2002 | Meixner et al. | |
| 6,547,277 B1 | 4/2003 | Adamini et al. | |
| 6,779,812 B2 * | 8/2004 | Ishida et al. ................ | 280/741 |

FOREIGN PATENT DOCUMENTS

| | | |
|---|---|---|
| DE | 19611102 | 9/1997 |
| DE | 19926606 | 11/2000 |
| EP | 0428298 | 5/1991 |
| EP | 0792776 | 9/1997 |
| EP | 0943502 | 9/1999 |
| EP | 0949126 | 10/1999 |
| EP | 0958973 | 11/1999 |
| EP | 1234732 | 8/2002 |

* cited by examiner

*Primary Examiner*—Paul N. Dickson
*Assistant Examiner*—Robert Coker
(74) *Attorney, Agent, or Firm*—Tarolli, Sundheim Covell & Tumminno LLP

(57) ABSTRACT

A gas generator, comprising a first and a second combustion chamber, each of which is associated with a propellant charge and an igniter, an outflow chamber with inflow- and outflow openings, arranged between the combustion chambers, and a partition plate dividing the outflow chamber into two partial chambers is provided. An edge region of the partition plate lies at least partially against a boundary of the outflow chamber. Each partial chamber is associated with one of the combustion chambers. A central section of the partition plate surrounded by the edge region has a geometry deviating from a plane and has at least one projection which is directed into one of the partial chambers.

9 Claims, 3 Drawing Sheets

GAS GENERATOR

FIELD OF THE INVENTION

The invention relates to a gas generator.

BACKGROUND OF THE INVENTION

Especially in multi-stage tube gas generators, as are used for example in passenger gas bag modules, usually a combustion chamber is provided at each axial end of the tubular housing, whereas in the centre between the combustion chambers a common outflow or filter chamber is arranged. In order to prevent an undesired ignition transfer between the two propellant charges, it is known to divide the common outflow chamber by a partition wall.

BRIEF DESCRIPTION OF THE INVENTION

It is an object of the present invention to simplify the manufacture of a gas generator and to make the gas generator itself more effective and more favourably priced.

This object is achieved in a gas generator, comprising a first and a second combustion chamber, each of which is associated with a propellant charge and an igniter, an outflow chamber with inflow- and outflow openings, arranged between the combustion chambers. Further, a partition plate dividing the outflow chamber into two partial chambers is provided. An edge region of the partition plate lies at least partially against a boundary of the outflow chamber. Each partial chamber is associated with one of the combustion chambers. A central section of the partition plate surrounded by the edge region has a geometry deviating from a plane and has at least one projection which is directed into one of the partial chambers.

Through its shape, the partition plate provides a flow path for gas flowing out from the combustion chamber through the outflow chamber to the outflow openings of the gas generator. The shape of the partition plate can be easily chosen so that the gas must come in contact with particular sections of the partition plate, whereby firstly a cooling effect and secondly a particle deposition, equivalent to a filter effect, can be achieved. Hereby, it is possible to use fewer filters, or even to dispense with filter inserts entirely. A further advantage of the use of such a partition plate lies in that the partition plate can be given a shape suited to fixing itself on its own in the outflow chamber, so that the partition plate no longer has to be fastened by further means, e.g. weld seams. This simplifies the production process.

The partition plate can have a shape which deviates distinctly from a planar shape.

Preferably, the partition plate has such a shape, e.g. by the stamping of projections and depressions, that in the outflow chamber, so-called clearance volumes are formed, in which particles can settle, when a gas stream flows through the outflow chamber. For this, the shape of the partition plate is chosen so that the partition plate creates clearance volumes in the partial chambers lying apart from a direct flow path from the inflow- to the outflow openings.

In order to prevent an unwanted ignition transfer between the propellant charges, it is advantageous if the partition plate completely separates the two partial chambers from each other as regards flow. This can mean both that the partition plate in itself does not have any openings, and also that the edge region of the partition plate seals in a gas-tight manner with the boundary of the outflow chamber.

In a preferred embodiment of the invention, each outflow chamber is delimited by a wall with at least one inflow opening from the associated combustion chamber, and the partition plate rests against the walls. For this, for example, projections are provided, which are directed into both partial chambers, so that the partition plate can be arranged non-displaceably in the outflow chamber.

In cross-section, the partition plate can have an undulating or W-shape, viewed in cross-section. Also, any other suitable shape can of course be used.

According to a preferred embodiment of the invention, provision is made that each outflow chamber is separated from the associated combustion chamber by a wall with at least one inflow opening, that the partition plate, viewed from each partial chamber, has at least one depression and the partition plate is arranged so that a depression lies opposite the inflow opening in each wall. Hereby, the distance of the partition plate from the inflow openings can be maximized in particular with respect to a flat plate, so that the inflowing gas only hits the material of the partition plate after a lengthy distance. Hereby, the thermal stress for the partition plate is reduced.

Preferably, in this case, at least one inflow opening is arranged in the wall of the first combustion chamber, staggered with respect to at least one inflow opening in the wall of the second combustion chamber.

Optionally, in the region of the outflow openings, a filter can be arranged.

The object is also achieved by a gas generator with a tubular housing, in which a combustion chamber, containing a charge, and an outflow chamber are arranged lying axially one behind the other and in which behind the outflow chamber, viewed in flow direction, i.e. in axial direction after the outflow chamber, a clearance volume is provided, which is separated from the outflow chamber except for at least one through-flow opening. The clearance volume is connected only with the outflow chamber with regard to flow. According to the invention, gas flows from the combustion chamber firstly into the outflow chamber and from there, via the outflow openings, can reach the external environment of the gas generator, e.g. a gas bag. However, a portion of the gas arrives through the through-flow opening into the clearance volume, where an expansion and a cooling of the gas and also a particle deposition occur. The gas then flows off through the through-flow opening back into the outflow chamber and from there via the outflow openings out from the gas generator.

In a preferred embodiment, the clearance volume is separated from the outflow chamber by a partition plate. Through the arrangement and size of the through-flow openings in the partition plate, and also the positioning of the partition plate in the tubular housing, whereby the size of the outflow chamber and of the clearance volume can be determined, a gas generator model can be configured quickly and flexibly for various requirements.

DETAILED DESCRIPTION OF PREFERRED EMBODIMENTS

Figure 1:
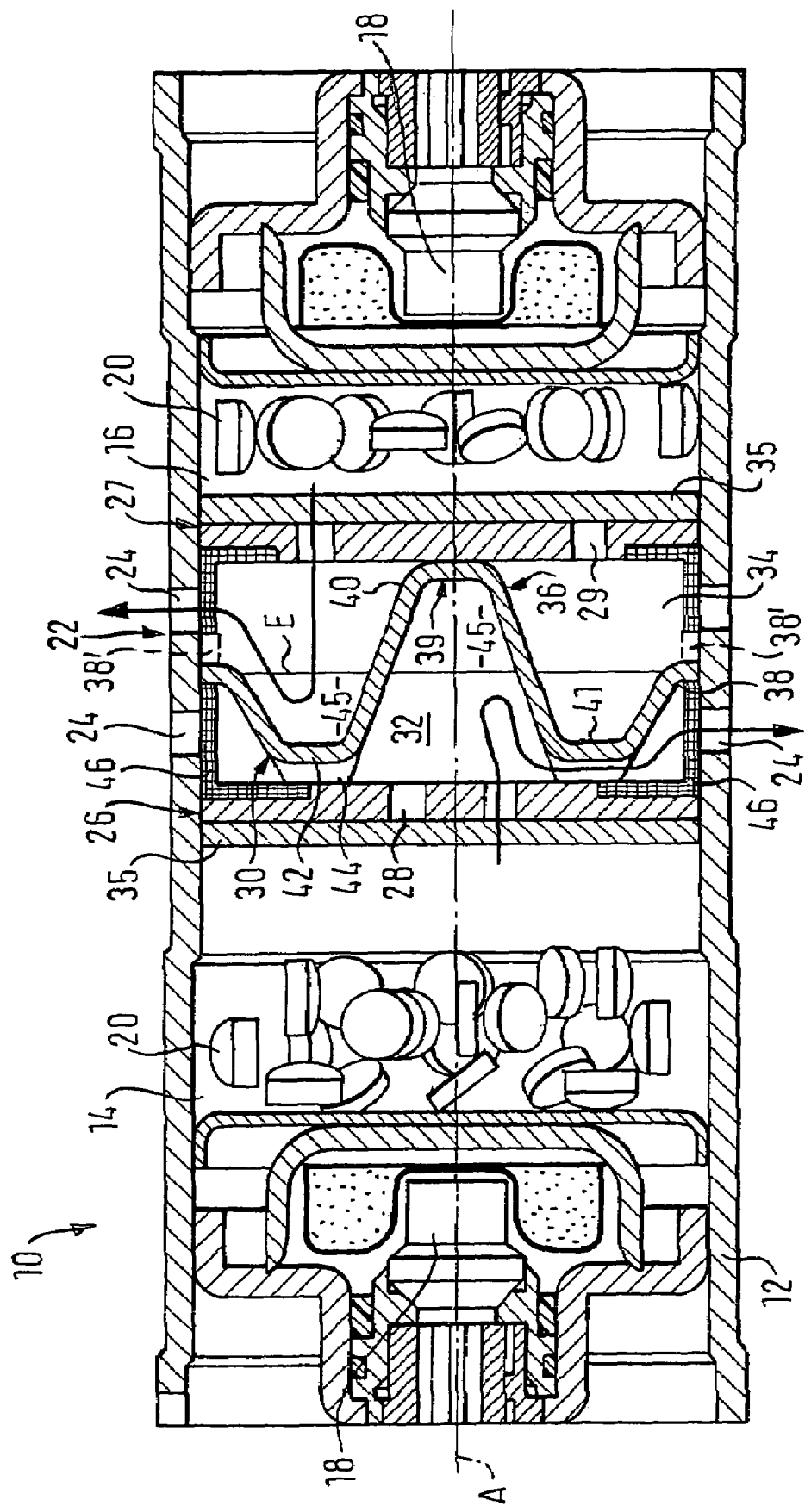
FIG. 1 shows a diagrammatic section through a gas generator according to the invention in accordance with a first embodiment.

FIG. 1 shows a gas generator 10 with a tubular housing 12. At the axial ends of the housing 12, a first and a second combustion chamber 14, 16 are arranged, each combustion chamber 14, 16 being connected with an igniter 18 and containing a propellant charge 20.

Between the combustion chambers 14, 16, an outflow chamber 22 is arranged, which has outflow openings 24 arranged in the cylindrical wall of the housing 12, through which gas generated from the propellant charges 20 in the combustion chambers 14, 16 can leave the outflow chamber 22.

The combustion chambers 14, 16 are separated from the outflow chamber 22 by a wall 26, 27 respectively, which respectively have inflow openings 28, 29, via which the combustion chambers 14, 16 are connected with the outflow chamber 22.

In each combustion chamber 14, 16 respectively in addition a membrane 35 is arranged in front of the combustion chamber wall 26, 27, which is destroyed and frees the inflow openings 28, 29, when the respective propellant charge 20 is ignited. It is also possible to use a filter here.

In the outflow chamber 22 a partition plate 30 is arranged, which divides the outflow chamber 22 into two partial chambers 32, 34 separated from each other with regard to flow.

The partition plate 30 is formed in a plastic manner so that in its central section 36 it has a shape deviating from a plane E, which is preferably at right-angles to the axis A. The central section 36 is surrounded by an edge region 38. In the example shown, the partition plate 30 has in the centre a central indentation 39, which forms for the partial chamber 34 a projection 40 projecting into it. The partial chamber 34 has a ring-shaped indentation 41 around the projection 40, and originating therefrom several deeper, punctiform indentations lying on a periphery. These indentations form a ring-shaped projection 42 with several dome-shaped projections 44, which project into the partial chamber 32.

The partition plate 30 is arranged in the outflow chamber 22 so that the edge region 38 lies with its outer surface against the housing 12, and namely so that, viewed in axial direction A, outflow openings 24 are arranged on each side of the partition plate 30. The central indentation 39 is so deep that the partition plate 30 rests with the projection 40 against the wall 27 of the second combustion chamber 16, whilst the ring-shaped indentation 41 is partially so deep that the corresponding projections 44 of the partition plate 30 rest against the wall 26 of the first combustion chamber 14. In this way, the partition plate 30 is fixed non-displaceably and pre-stressed in the outflow chamber 22.

The inflow openings 28 in the wall 26 are arranged so that they lie opposite the central indentation 39 of the partition plate 30. The inflow openings 29 in the wall 27, on the other hand, are arranged so that they lie opposite the ring-shaped indentation 41. The inflow openings 28 in the wall 26 are therefore staggered with respect to the inflow openings 29 in the wall 27 of the second combustion chamber 16. This has the result that the inflowing hot gas only hits the partition plate 30 after as long a distance as possible, so that its thermal stress is reduced to a maximum extent.

Through the central indentation 39 and the ring-shaped indentation 41 in combination with the projections 40, 42, 44, clearance volumes 45 are formed in the partial chambers 32, 34, which are not situated on the direct flow path between the inflow openings 28, 29 and the outflow openings 24. In these clearance volumes 45, particles contained in the gas stream can settle. Hereby, the partition plate 30 carries out a filtering effect.

From the first combustion chamber 14, the gas arrives through the inflow openings 28 firstly into the central indentation 39, where particles contained therein can settle in the clearance volume which is formed here. Then the gas flows between the dome-shaped projections 44 radially outwards (see arrow).

The gas from the second combustion chamber 16 flows through the inflow openings 29 into the indentation 41 and from there directly to the outflow openings 24 (see arrow in FIG. 1). Here, also, the clearance volumes serve to collect particles.

Optionally, a known filter 46 can also be additionally arranged in front of the outflow openings 24.

It is also possible to form the edge region 38 of the partition plate 30 to a cylindrical collar 38', which lies flat against the wall of the housing 12, as is indicated in dashed lines in FIG. 1.

The edge region 38 of the partition plate 30 does not have to lie in a plane. The partition plate 30 can be given its desired shape by deformation of a flat sheet. The partition plate 30 in all the embodiments is a separate component from other components of the gas generator, such as the combustion chamber walls, for example.

Figure 2:
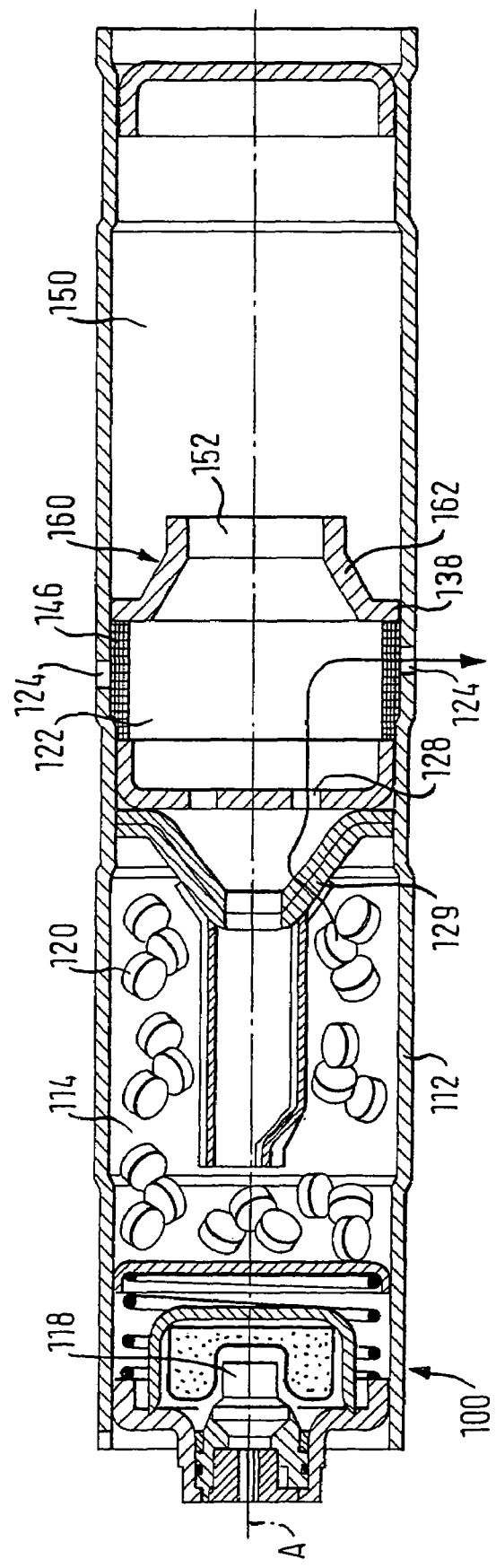
FIG. 2 shows a diagrammatic section through a gas generator according to the invention in accordance with a second embodiment.

FIG. 2 shows a second embodiment of a gas generator 100. This can either be a single-stage gas generator or a part of a two-stage gas generator, in which the second half would adjoin the first half shown, in mirror image thereto.

In a tubular housing 112, at one axial end a combustion chamber 114 with a propellant charge 120 and an associated igniter 118 is provided. In axial direction A, an outflow chamber 122 with outflow openings 124 adjoins the combustion chamber 114, viewed in flow direction. In the wall of the combustion chamber 114, inflow openings 128 are provided, which connect the combustion chamber 114 with the outflow chamber 122 with regard to flow.

In the combustion chamber 114 in addition a known pre-filter 129 is arranged. In front of the outflow openings 124 optionally a filter 146 can be provided.

Situated in flow direction behind the outflow chamber 122 (shown in FIG. 2 by an arrow), is a clearance volume 150. The clearance volume 150 is delimited from the outflow chamber 122 by a partition plate 160 provided with a through-flow opening 152. The edge 138 of the partition plate 160 is securely fastened on the wall of the housing 112.

The clearance volume 150 has no other opening than the through-flow opening 152, so that it is connected with regard to flow only with the outflow chamber 122.

The partition plate 160 has a nozzle form with an axially elongated central section 162 converging in a frustum shape, which is directed towards the clearance volume 150.

Both the size of the outflow chamber 122 and also the size of the clearance volume 150 are determined by the position of the partition plate 160. This, together with the diameter of the through-flow opening 152, can be used for adapting the characteristic of a gas generator model.

A portion of the gas flowing in from the combustion chamber 114 into the outflow chamber 122 arrives through the through-flow opening 152 into the clearance volume 150, where the gas is cooled and particles are separated. The gas then flows back through the through-flow opening 152 and leaves the gas generator through the outflow openings 124.

Figure 3:
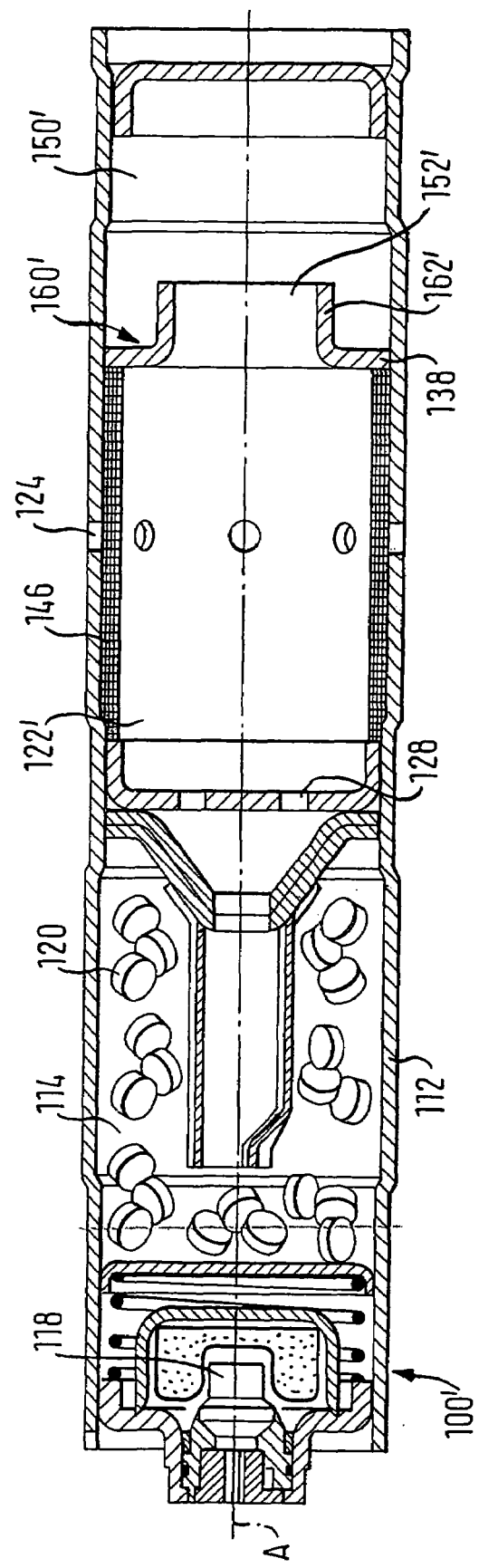
FIG. 3 shows a diagrammatic section through a gas generator according to the invention in accordance with a third embodiment.

FIG. 3 shows a variant of the gas generator 100 from FIG. 2. Only the different components are described.

In the gas generator 100', the outflow chamber 122' is greater than the clearance volume 150', whereas the reverse is the case in the embodiment shown in FIG. 2. In addition, the central section 162' of the partition plate 160' does not run in a frustum shape, but rather is constructed as a cylinder with walls which run straight. The mode of operation, however, is the same.

What is claimed is:

1. A gas generator, comprising:
    a first and a second combustion chamber (14, 16), each of which is associated with a propellant charge (20) and an igniter (18),
    an outflow chamber (22) with inflow- and outflow openings (28, 29, 24), arranged between said combustion chambers (14, 16),
    and a partition plate (30) dividing said outflow chamber (22) into two partial chambers (32, 34), an edge region (38) of said partition plate lying at least partially against a boundary (12) of said outflow chamber (22), each partial chamber (32, 34) being associated with one of said combustion chambers (14, 16),
    characterized in that a central section (36) of said partition plate (30) surrounded by said edge region (38) has a geometry deviating from a plane (E) and has at least one projection (40, 42, 44) which is directed into one of said partial chambers (32, 34).

2. The gas generator according to claim 1, wherein as a result of a shape of said partition plate (30) clearance volumes (45) are formed in said outflow chamber (22), in which particles settle, when a gas stream flows through said outflow chamber (22).

3. The gas generator according to claim 1, wherein said partition plate (30) separates said two partial chambers (32, 34) completely from each other with regard to flow.

4. The gas generator according to claim 1, wherein each partial chamber (32, 34) is delimited from its associated combustion chamber (14, 16) by a wall (26, 27) having at least one inflow opening (28, 29), said partition plate (30) resting against said walls (26, 27).

5. The gas generator according to claim 1, wherein each partial chamber (32, 34) is delimited from its associated combustion chamber (14, 16) by a wall (26, 27) having at least one inflow opening (28, 29), said partition plate (30), viewed from each partial chamber (32, 34), having at least one indentation (39, 41), and said partition plate (30) being arranged so that an indentation (39, 41) lies opposite said inflow opening (28, 29) in each wall (26, 27).

6. The gas generator according to claim 4, wherein at least one inflow opening (28) in said wall (26) of said first combustion chamber (14) is arranged staggered with respect to at least one inflow opening (29) in said wall (27) of said second combustion chamber (16).

7. The gas generator according to claim 1, wherein a filter (46) is arranged in a region of said outflow openings (24).

8. A gas generator comprising:
    a tubular housing (112), in which a combustion chamber (114) containing a propellant charge (120), and an outflow chamber (122; 122') are arranged axially one behind the other,
    the outflow chamber (122; 122') having at least one outflow opening (124), through which gas leaves the gas generator (100; 100'),
    a clearance volume (150; 150') being provided in axial direction after said outflow chamber (122; 122'), the clearance volume (150; 150') being separated from said outflow chamber (122; 122') except for at least one through-flow opening (152; 152'), said clearance volume (150; 150') being connected with regard to flow only with said outflow chamber (122; 122').

9. The gas generator according to claim 8, wherein said clearance volume (150; 150') is separated from said outflow chamber (122; 122') by a partition plate (160; 160'), which has said through-flow opening (152; 152').

* * * * *